(12) United States Patent
Kim et al.

(10) Patent No.: US 11,714,336 B2
(45) Date of Patent: Aug. 1, 2023

(54) CAMERA MODULE

(71) Applicant: SAMSUNG ELECTRO-MECHANICS CO., LTD., Suwon-si (KR)

(72) Inventors: Dae Seob Kim, Suwon-si (KR); Tae Hoon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/410,010

(22) Filed: Aug. 24, 2021

(65) Prior Publication Data
US 2022/0252964 A1   Aug. 11, 2022

(30) Foreign Application Priority Data

Feb. 10, 2021   (KR) ................... 10-2021-0019049

(51) Int. Cl.
| | | |
|---|---|---|
| *G03B 17/55* | (2021.01) | |
| *G03B 17/12* | (2021.01) | |
| *G02B 7/02* | (2021.01) | |
| *H04N 23/52* | (2023.01) | |
| *H04N 23/54* | (2023.01) | |

(52) U.S. Cl.
CPC ............ *G03B 17/55* (2013.01); *G02B 7/028* (2013.01); *G03B 17/12* (2013.01); *H04N 23/52* (2023.01); *H04N 23/54* (2023.01)

(58) Field of Classification Search
CPC ... G03B 17/55; B60R 11/04; B60R 2300/105; H04N 5/2252; H04N 5/2254; H04N 5/2257; G02B 7/021; G02B 7/028
See application file for complete search history.

(56) References Cited

U.S. PATENT DOCUMENTS

| | | | | |
|---|---|---|---|---|
| 6,507,700 | B1 * | 1/2003 | Takekuma | H04N 5/2252 396/25 |
| 9,386,239 | B2 * | 7/2016 | Gustafson | G01J 5/05 |
| 9,961,722 | B2 * | 5/2018 | Chae | G03B 17/55 |
| 10,244,932 | B2 * | 4/2019 | Fujii | A61B 1/0019 |
| 10,863,061 | B2 * | 12/2020 | Uetsuji | H04N 5/2252 |

(Continued)

FOREIGN PATENT DOCUMENTS

| | | | | |
|---|---|---|---|---|
| CN | 208351223 U | * | 1/2019 | |
| CN | 110244502 A | * | 9/2019 | G03B 17/55 |

(Continued)

OTHER PUBLICATIONS

Korean Office Action dated May 27, 2022, in counterpart Korean Patent Application No. 10-2021-0019049 (8 pages in English and 5 pages in Korean).

(Continued)

*Primary Examiner* — Leon W Rhodes, Jr.
(74) *Attorney, Agent, or Firm* — NSIP Law

(57) ABSTRACT

A camera module includes a first lens barrel configured to receive one or more lens groups, a second lens barrel coupled to the first lens barrel and configured to support a front lens disposed on an object side of the one or more lens groups, an energy generating unit configured to contact the second lens barrel and configured to supply thermal energy to the second lens barrel, and a barrel holder coupled to the first lens barrel and configured to accommodate the energy generating unit.

21 Claims, 8 Drawing Sheets

(56) References Cited

U.S. PATENT DOCUMENTS

| | | | |
|---|---|---|---|
| 11,082,640 B2* | 8/2021 | Nagata | G02B 7/028 |
| 11,116,047 B2* | 9/2021 | Chien | G03B 17/55 |
| 2012/0262568 A1* | 10/2012 | Ruthenberg | A01B 69/001 |
| | | | 348/148 |
| 2015/0301303 A1 | 10/2015 | Kim et al. | |
| 2017/0223245 A1 | 8/2017 | Park | |
| 2018/0188636 A1 | 7/2018 | Kim | |
| 2019/0033690 A1 | 1/2019 | Choi | |
| 2019/0094484 A1* | 3/2019 | Hasegawa | G02B 7/028 |
| 2019/0137850 A1 | 5/2019 | Ha et al. | |
| 2020/0116994 A1* | 4/2020 | Gu | B60S 1/56 |

FOREIGN PATENT DOCUMENTS

| | | |
|---|---|---|
| JP | 2004-20798 A | 1/2004 |
| KR | 10-2015-0120735 A | 10/2015 |
| KR | 10-2016-0016107 A | 2/2016 |
| KR | 10-2017-0004053 A | 1/2017 |
| KR | 10-2017-0095613 A | 8/2017 |
| KR | 10-2018-0006045 A | 1/2018 |
| KR | 10-2019-0051604 A | 5/2019 |

OTHER PUBLICATIONS

Notice of Reason for Rejection dated Nov. 23, 2022, in counterpart Korean Patent Application No. 10-2021-0019049 (9 pages in English, 6 pages in Korean).

* cited by examiner

LG1-L2, L3, L4
LG2-L5, L6, L7

I-I

LG1-L2, L3, L4
LG2-L5, L6, L7

LG – L1, L2, L3, L4, L5, L6

II-II

CAMERA MODULE

CROSS-REFERENCE TO RELATED APPLICATIONS

This application claims the benefit under 35 USC 119(a) of Korean Patent Application No. 10-2021-0019049 filed on Feb. 10, 2021, in the Korean Intellectual Property Office, the entire disclosure of which is incorporated herein by reference for all purposes.

BACKGROUND

1. Field

The following description relates to a camera module configured to significantly reduce an influence of external environmental changes.

2. Description of the Background

Resolution and field of view of camera modules may depend on the state of foremost lenses. For example, foreign materials (dust, frost, water droplets, or the like) attached to a foremost lens may impair a resolution of a camera module or make the actual angle of view and field of view narrow. In detail, since a camera module exposed externally is prone to frost, dew, or the like on the foremost lens, the resolution of the camera module may be deteriorated, and the field of view may be obstructed due to foreign materials.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens barrel configured to receive one or more lens groups, a second lens barrel coupled to the first lens barrel and configured to support a front lens disposed on an object side of the one or more lens groups, an energy generating unit configured to contact the second lens barrel and configured to supply thermal energy to the second lens barrel, and a barrel holder coupled to the first lens barrel and configured to accommodate the energy generating unit.

The second lens barrel may be formed of a material having a thermal conductivity higher than a thermal conductivity of the first lens barrel.

The second lens barrel may be formed of a material having a thermal conductivity higher than a thermal conductivity of the barrel holder.

The camera module may further include a first airtight member disposed between the first lens barrel and the second lens barrel.

The camera module may further include a housing configured to be coupled to the barrel holder.

The camera module may further include a cover member coupled to the second lens barrel and configured to press an edge of the front lens.

The camera module may further include a second airtight member disposed between the barrel holder and the cover member.

The camera module may further include a gap maintaining member disposed between the one or more lens groups and the front lens.

In another general aspect, a camera module includes a first lens barrel configured to accommodate one or more lens groups, a second lens barrel coupled to the first lens barrel and configured to support a protective glass disposed on an object side of the one or more lens groups, an energy generating unit configured to contact the second lens barrel and configured to supply thermal energy to the protective glass, and a barrel holder coupled to the first lens barrel and configured to receive the energy generating unit.

The camera module may further include a first airtight member disposed on the first lens barrel and the second lens barrel.

The camera module may further include a cover member coupled to the second lens barrel and configured to press an edge of the protective glass.

The energy generating unit may include a heating member, a first electrode member disposed on one side of the heating member, and a second electrode member disposed on an other side of the heating member.

The camera module may further include a first substrate coupled to the barrel holder and provided with an image sensor mounted thereon.

The camera module may further include a second substrate electrically connected to the energy generating unit and disposed at a distance from the first substrate.

In another general aspect, a camera module includes an energy generating unit, a front lens disposed on an optical axis, a heat transfer member disposed between the energy generating unit and the front lens, wherein the heat transfer member is configured to supply thermal energy to the front lens.

The front lens may have refractive power.

The camera module may further include a first lens barrel disposed toward an image side of the front lens, and configured to accommodate one or more lens groups along the optical axis, wherein the heat transfer member may have greater thermal conductivity than the first lens barrel.

The heat transfer member may include a second lens barrel coupled to the first lens barrel, and be configured to support the front lens.

The camera module may further include a barrel holder accommodating the first lens barrel, wherein the second lens barrel may be formed of a material having a thermal conductivity higher than a thermal conductivity of the barrel holder.

The camera module may further include a sealing structure disposed between the heat transfer member and the front lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
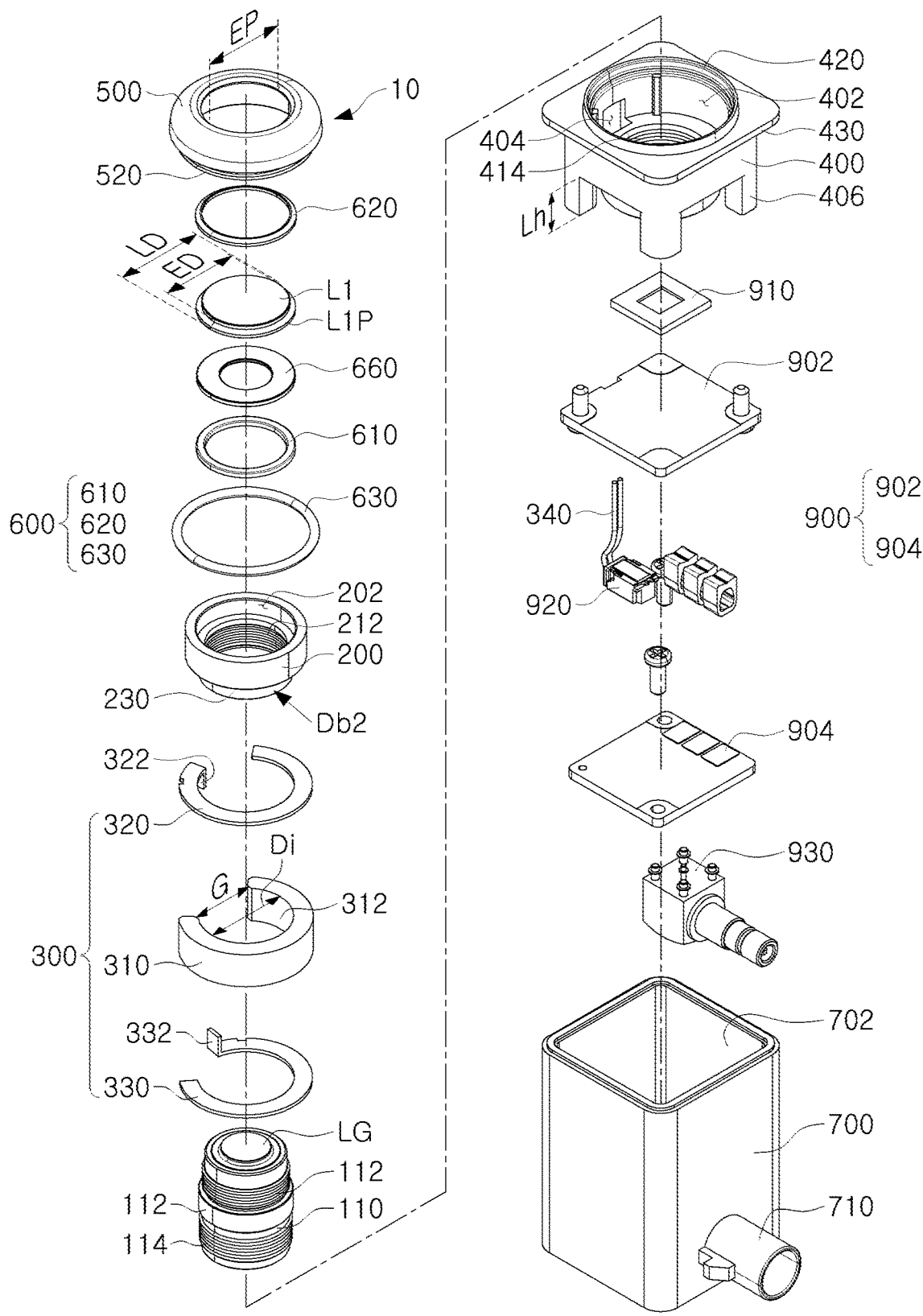
FIG. 1 is an exploded perspective view of a camera module according to an example.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is to be noted that use of the term "may" with respect to an embodiment or example, for example, as to what an embodiment or example may include or implement, means that at least one embodiment or example exists in which such a feature is included or implemented while all embodiments and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

Examples disclosed herein provide a camera module configured to remove foreign materials, frost, or the like attached to a frontmost lens.

The camera module according to an example of the present disclosure may be mounted on a device that is easily exposed to an external environment. For example, the camera module may be mounted on a vehicle, a surveillance device for crime prevention, a surveillance device for security, or the like. However, the scope of use of the camera module according to an example of the present disclosure is not limited to the above-described devices. For example, the camera module according to an example may be mounted on a calling device in a common entrance of an apartment, a calling device in a building entrance, or the like.

The camera module may be configured to convert an optical signal reflected from a subject into an electric signal. For example, the camera module may convert an optical signal incident through one or more lenses into an electrical signal through an image sensor. A resolution of the camera module may depend on the amount of light incident on the camera module. For example, if the amount of light incident on the camera module decreases or increases due to a foreign material attached to the cover glass or the front lens of the camera module, phase conversion through the image sensor may not be performed smoothly.

In an example of the present disclosure, the camera module may be configured to remove foreign materials adhering to the protective glass of the camera module or the front lens through various types of energy. For example, a camera module according to an example may remove water droplets, frost, moisture, ice, or the like attached to, condensed or aggregated on a protective glass or a front lens by using thermal energy.

A camera module according to an example may include a lens barrel, an energy generating unit, and a barrel holder. However, the configuration of the camera module is not limited to the lens barrel, energy generating unit, and barrel holder.

The lens barrel may be comprised of a first lens barrel and a second lens barrel. However, the configuration of the lens barrel is not limited to the first lens barrel and the second lens barrel. For example, the lens barrel may further include a third lens barrel in addition to the first and second lens barrels. The lens barrel may be configured to receive a lens. For example, the first lens barrel may be configured to receive one or more lens groups, and the second lens barrel may be configured to support or receive a front lens disposed on the object side of the lens group.

The first lens barrel and the second lens barrel may be formed of different materials. For example, the second lens barrel may be formed of a material having a higher thermal conductivity than that of the first lens barrel. For example, the first lens barrel may be formed of a material such as plastic or a resin, and the second lens barrel may be formed of a metal material or a material including metal.

The energy generating unit may be configured to supply thermal energy to the lens barrel. For example, the energy generating unit may be configured to supply thermal energy to the second lens barrel. The energy generating unit may be configured to convert electrical energy into thermal energy. For example, the energy generating unit may be comprised of a Positive Temperature Coefficient (PTC) heater. However, the form of the energy generating unit is not limited to the PTC heater.

The barrel holder may be configured to be coupled to the lens barrel. For example, the barrel holder may be coupled to a first lens barrel. The barrel holder may be configured to receive the energy generating unit. For example, the barrel holder may be configured to receive the energy generating unit therein while being coupled to the first lens barrel. The barrel holder may be formed of a material different from that of the lens barrel. For example, the barrel holder may be formed of a material having a lower thermal conductivity than that of the second lens barrel.

The camera module may further include other components in addition to the above-described members. For example, the camera module may further include an airtight member, a housing cover member, and the like.

Hereinafter, an example will be described in detail on the basis of the accompanying drawings.

First, a camera module according to an example will be described with reference to FIGS. 1 to 4.

A camera module 10 according to an example includes a first lens barrel 100, a second lens barrel 200, an energy generating unit 300, and a barrel holder 400. In addition, the camera module 10 may further include a cover member 500, an airtight member 600, a housing 700, and a substrate 900.

The first lens barrel 100 is configured to accommodate one or more lens groups LG (LG1, LG2). For example, disposed along an optical axis "C". For example, the first lens barrel 100 may be configured to accommodate a first lens group LG1 comprised of three lenses L2, L3, and L4, and a second lens group LG2 comprised of three lenses L5, L6, and L7. However, the number of lens groups accommodated in the first lens barrel 100 is not limited to two. For example, the first lens barrel 100 may be configured to accommodate one lens group comprised of four to six lenses. As another example, the first lens barrel 100 may be configured to accommodate a first lens group comprised of two to four lenses and a second lens group comprised of two to four lenses.

The first lens barrel 100 may be configured to maintain the lens group LG at a constant temperature. For example, the first lens barrel 100 may be formed of a material having relatively low thermal conductivity such that external heat or cold air is not transmitted to the lens group LG accommodated therein. The first lens barrel 100 may be configured to enable the camera module 10 to be lightweight. For example, the first lens barrel 100 may be formed of a material such as plastic that is lightweight and resistant to impacts. However, the material of the first lens barrel 100 is not limited to plastic.

The first lens barrel 100 may be configured to be rigidly coupled to neighboring members. As an example, a first screw portion 112 for coupling with the second lens barrel 200 may be formed on a portion of the first lens barrel 100. As another example, a second screw portion 114 for coupling with the barrel holder 400 may be formed on another portion of the first lens barrel 100. The screw portions 112 and 114 may be respectively formed on the outer circumferential surface of the first lens barrel 100. For example, the first screw portion 112 may be formed on the upper outer circumferential surface of the first lens barrel 110, and the second screw portion 114 may be formed on the lower outer circumferential surface of the first lens barrel 110. The screw portions 112 and 114 may be configured to define a coupling position between the first lens barrel 100 and the second lens barrel 200 and the barrel holder 400. For example, the first screw portion 112 and the second screw portion 114 may be formed to have different sizes. In detail, the second lens barrel 200 may be limitedly coupled to the first screw portion 112 of the first lens barrel 100, and the barrel holder 400 may be limitedly coupled to the second screw portion 114 of the first lens barrel 100. Accordingly, the first lens barrel 100 according to this example may significantly reduce an assembly failure phenomenon due to a change in the coupling position of the second lens barrel 200 and the barrel holder 400.

The first lens barrel 100 may include a configuration for defining a coupling position of the second lens barrel 200. For example, a first stepped portion 122 for contacting an end portion of the second lens barrel 200 may be formed on an outer peripheral surface of the first lens barrel 100. The first stepped portion 122 may be configured so as not to interfere with screwing of the first lens barrel 100 and the second lens barrel 200. For example, the first stepped portion 122 may be formed between the first screw portion 112 and the second screw portion 114.

The second lens barrel 200 is configured to be coupled to the first lens barrel 100. For example, a screw portion 212 fastened to the first screw portion 112 may be formed in the inner peripheral surface of the second lens barrel 200. Accordingly, the second lens barrel 200 may be firmly coupled to the first lens barrel 100 by fastening between the first screw portion 112 and the screw portion 212.

The second lens barrel 200 may be configured to accommodate one or more lenses. For example, the second lens barrel 200 may accommodate a front lens L1 in an internal space 202. The front lens L1 may be disposed on the object side of the lens group LG. The front lens L1 may be a lens disposed closest to the object side among lenses constituting the camera module 10. In detail, the front lens L1 may be disposed on an outermost side (in front of the camera module 10), among lenses having refractive power. The second lens barrel 200 may be configured to contact the front lens L1. For example, the second lens barrel 200 may contact a flange portion DP of the front lens L1.

The second lens barrel 200 may be configured to absorb thermal energy generated from the energy generating unit 300. For example, the second lens barrel 200 may be formed of a material having relatively high specific heat to absorb a significant amount of thermal energy. The second lens barrel 200 may be configured to transfer the absorbed thermal energy to the front lens L1. For example, the second lens barrel 200 may be formed of a material having high thermal conductivity. In detail, the second lens barrel 200 may be formed of a metal material. However, the material of the second lens barrel 200 is not limited to metal. The second lens barrel 200 may have a higher thermal conductivity than neighboring members. For example, the second lens barrel 200 may be formed of a material having a higher thermal conductivity than that of the first lens barrel 100 and the barrel holder 400.

The second lens barrel 200 may be configured to contact the energy generating unit 300. In detail, the second lens barrel 200 may be configured to be in contact with the energy generating unit 300 in a state in which the second lens barrel 200 is coupled to the first lens barrel 100. The second lens barrel 200 may include an extension 230 extending downwardly (in the direction of the image sensor). The extension 230 may be configured to contact the energy generating unit 300. For example, the extension 230 may contact the energy generating unit 300 while the second lens barrel 200 is coupled to the first lens barrel 100. The second lens barrel 200 may be configured to be in closer contact with the energy generating unit 300 than the first lens barrel 100. For example, a distance from an inner surface 312 of the energy generating unit 300 to an outer peripheral surface of the extension 230 may be less than a distance from the inner surface 312 of the energy generating unit 300 to an outer peripheral surface of the first lens barrel 100. However, the distance from the inner surface 312 of the energy generating unit 300 to the outer peripheral surface of the extension 230 is not necessarily less than the distance from the inner surface 312 of the energy generating unit 300 to the outer peripheral surface of the first lens barrel 100. For example, the distance from the inner surface 312 of the energy generating unit 300 to the outer peripheral surface of the extension 230 may be approximately the same as the distance from the inner surface 312 of the energy generating unit 300 to the outer peripheral surface of the first lens barrel 100.

The energy generating unit 300 may be configured to generate thermal energy for heating an adjacent member. For example, the energy generating unit 300 may include an electrical resistor configured to convert electrical energy into thermal energy. As another example, the energy generating unit 300 may be configured in the form of a PTC heater configured to dissipate heat of a constant temperature. As another example, the energy generating unit 300 may include a vibration device configured to generate thermal energy through vibration. However, the shape of the energy generating unit 300 is not limited to the types listed above.

The energy generating unit 300 according to this example may include a heating member 310, a first electrode member 320, and a second electrode member 330.

The heating member 310 may be configured to convert electrical energy into thermal energy. For example, the heating member 310 may be formed of a material such as ceramic having high electrical resistance. However, the material of the heating member 310 is not limited to ceramic. The heating member 310 may be formed in a ring shape with one side thereof open. The heating member 310 may be configured to be elastically deformable. For example, a distance G between both ends of the heating member 310 may be expanded or reduced according to elastic deformation of the heating member 310.

The heating member 310 may be configured to be in close contact with the second lens barrel 200. For example, an inner diameter Di of the heating member 310 may be substantially the same as an outer diameter Db2 of an extension 220 of the second lens barrel 200. However, the inner diameter Di of the heating member 310 is not necessarily the same as the outer diameter Db2 of the extension 220 of the second lens barrel 200. For example, the inner diameter Di of the heating member 310 may be less than the outer diameter Db2 of the extension 220 of the second lens barrel 200. The inner diameter Di of the heating member 200 may be changed by elastic deformation of the heating member 200. For example, the inner diameter Di of the heating member 310 may be formed less than the outer diameter Db2 of the extension 220 of the second lens barrel 200. However, when the heating member 310 is coupled to the extension 220 of the second lens barrel 200, the inner diameter Di of the heating member 310 may be transformed into approximately the same size as the outer diameter Db2 of the extension 220 by elastic deformation. As described above, since the heating member 310 that is elastically deformable may be in close contact with the second lens barrel 200, thermal energy contained therein may be quickly transferred to the second lens barrel 200.

The first electrode member 320 and the second electrode member 330 may be configured to supply current to the heating member 310. For example, the first electrode member 320 and the second electrode member 330 are electrically connected to a power supply terminal 920 of the substrate 900, to provide current supplied from the power supply terminal 920 to the heating member 310. The first electrode member 320 and the second electrode member 330 may be disposed on the heating member 310. For example, the first electrode member 320 may be disposed above the heating member 310, and the second electrode member 330 may be disposed below the heating member 310. However, the arrangement positions of the electrode members 320 and 330 are not limited to the upper and lower portions of the heating member 310. For example, the electrode members 320 and 330 may also be disposed on the inner and outer circumferential surfaces of the heating member 310 within a range that does not interfere with the contact between the heating member 310 and the second lens barrel 200. The electrode members 320 and 330 may be configured to be connected to a connection line 340 (see FIG. 3). For example, terminals 322 and 332 to be connected to the connection line 340 may be formed on one ends of the electrode members 320 and 330. The terminals 322 and 332 may be formed to be bent toward one side. For example, the terminals 322 and 332 may be configured to be bent in a longitudinal direction of the camera module 10. However, the terminals 322 and 332 are not necessarily configured in a bent shape.

The barrel holder 400 may be configured to accommodate the first lens barrel 100. For example, the first lens barrel 100 may be accommodated in an internal space 402 of the barrel holder 400. The barrel holder 400 may be configured to be coupled to the first lens barrel 100. For example, a screw portion 414 to be fastened to the second screw portion 114 of the first lens barrel 100 may be formed in the internal space 402 of the barrel holder 400.

The barrel holder 400 may be configured to enable the withdrawal and insertion of the connection line 340. For example, a hole 404 may be formed in one side of the barrel holder 400 to allow the connection line 340 to be taken out and carried in.

The barrel holder 400 may be configured to be coupled to the substrate 900. For example, the barrel holder 400 may be coupled to the substrate 900 by a plurality of leg members 406 extending downwardly. The barrel holder 400 may be configured in such a manner that a distance from the end of the first lens barrel 100 to the substrate 900 or an image sensor 910 is sufficiently formed. For example, the leg member 406 of the barrel holder 400 may be extended to have a significant length Lh such that a distance from the end of the first lens barrel 100 to the image sensor 910 is sufficiently formed.

The cover member 500 may be configured to be coupled to the second lens barrel 200. For example, the cover member 500 may be firmly coupled to the outer circumferential surface of the second lens barrel 200 by a method of force fitting, screw fastening, or the like.

The cover member 500 may be configured to prevent separation of the front lens L1. For example, the cover member 500 may be coupled to the second lens barrel 200 while pressing the edge of the front lens L1. The cover member 500 may have an opening 510 that allows the incidence of light. A diameter EP of the opening 510 may have a predetermined large-and-small relationship with the size of the front lens L1. For example, the diameter EP of the opening 510 may be substantially the same as or greater than an effective diameter ED of the front lens L1. As another example, the diameter EP of the opening 510 may be less than a maximum diameter LD (maximum diameter including the flange portion DP) of the front lens L1.

The cover member 500 may be configured to significantly reduce penetration of external heat or cold air. For example, the cover member 500 may be formed of a material having low thermal conductivity. The cover member 500 may be configured to significantly reduce a phenomenon in which heat of the second lens barrel 200 is lost externally. For example, the cover member 500 may be formed of a material capable of keeping warm.

The airtight member 600 may be configured to block the intrusion or penetration of external air or foreign materials into the camera module 10. For example, the airtight member 600 may be configured to block the intrusion of external air or foreign materials through the coupled portion between the member and the member. The airtight member 600 may include a first airtight member 610, a second airtight member 620, and a third airtight member 630.

Figure 3:
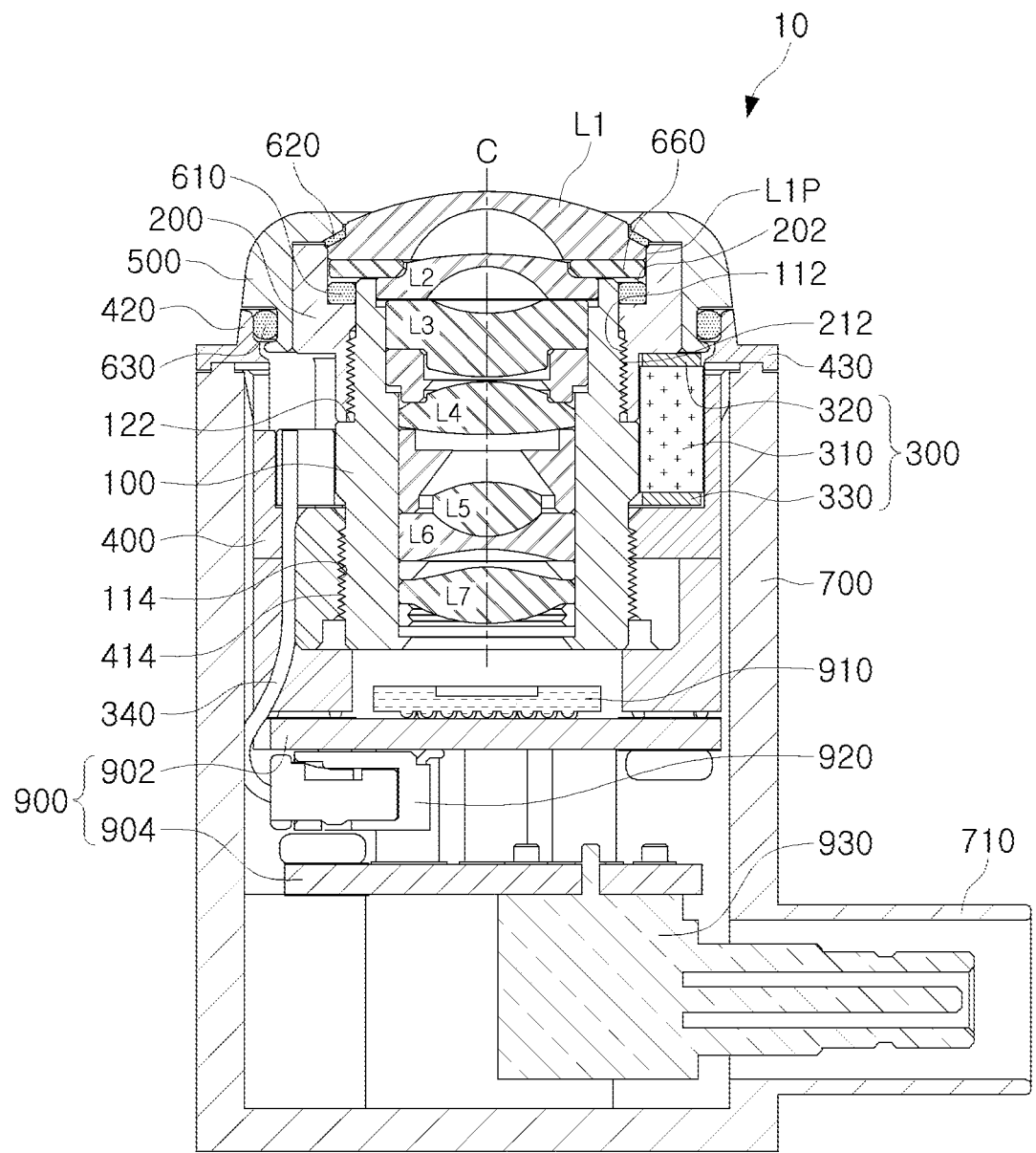
FIG. 3 is a cross-sectional view of the camera module illustrated in FIG. 2.

The first airtight member 610 may be disposed between the first lens barrel 100 and the second lens barrel 200. For example, the first airtight member 610 is disposed between the outer circumferential surface of the first lens barrel 100 and the inner circumferential surface of the second lens barrel 200 as illustrated in FIG. 3, to block the inflow of foreign materials through the coupled portion between the first lens barrel 100 the second lens barrel 200.

The second airtight member 620 may be disposed between the front lens L1 and the cover member 500. For example, the second airtight member 620 is disposed between the flange portion DP of the front lens L1 and the cover member 500, to block the inflow of foreign materials and external air through a contact portion or gap between the front lens L1 and the cover member 500.

The third airtight member 630 may be disposed between the barrel holder 400 and the cover member 500. For example, the third airtight member 630 is disposed between an upper stepped portion 420 of the barrel holder 400 and a lower extension 520 of the cover member 500, to block the inflow of foreign materials and outside air through a gap between the barrel holder 400 and the cover member 500.

The camera module 10 may further include a gap maintaining member 660 as necessary. The gap maintaining member 660 may be disposed between the front lens L1 and the lens group LG to maintain a constant distance between the front lens L1 and the lens group LG. In addition, the gap maintaining member 660 may be configured to block or significantly reduce heat transfer between the front lens L1 and the lens group LG. For example, the gap maintaining member 660 may be formed of a material having relatively low thermal conductivity.

The housing 700 may be configured to accommodate the lens barrels 100 and 200, the energy generating unit 300, the barrel holder 400, and the substrate 900 therein. For example, an internal space 702 capable of accommodating the aforementioned members may be formed in the housing 700. The internal space 702 may be open to one side (upper side) of the housing 700.

The housing 700 may be configured to be coupled to the barrel holder 400. For example, the housing 700 may be coupled to a flange 430 of the barrel holder 400 by a protrusion and a groove, a bolt or screw, an adhesive, or the like. The housing 700 may include a configuration for enabling connection between the substrate 900 or a component mounted on the substrate 900 and an external device. For example, a connector 710 that is open inwardly may be formed on one side of the housing 700.

The housing 700 may be configured to protect internal components from external impacts. For example, the housing 700 may be formed of a material having predetermined strength and rigidity. The housing 700 may be configured to significantly reduce performance degradation of the camera module 10 due to external heat and cold air. For example, the housing 700 may be formed of a material having low thermal conductivity to maintain a constant internal temperature.

The substrate 900 may provide a mounting space for various components required for the operation of the camera module 10. For example, the image sensor 910, the power supply terminal 920, a connection terminal 930, a passive device, and the like may be mounted on the substrate 900. The substrate 900 may be configured in plural. For example, the substrate 900 may include a first substrate 902 and a second substrate 904. However, the number of substrates 900 is not limited to two. For example, the number of substrates 900 may be one, or three or more.

The image sensor 910 is disposed on the first substrate 902 and is configured to convert an optical signal into an electric signal. The power supply terminal 920 is electrically connected to the energy generating unit 300 and may supply current required for the operation of the energy generating unit 300. The power supply terminal 920 may be disposed on the first substrate 902 or the second substrate 904. The connection terminal 930 is disposed on the second substrate 904 and may enable electrical connection between the camera module 10 and an external device.

Figure 2:
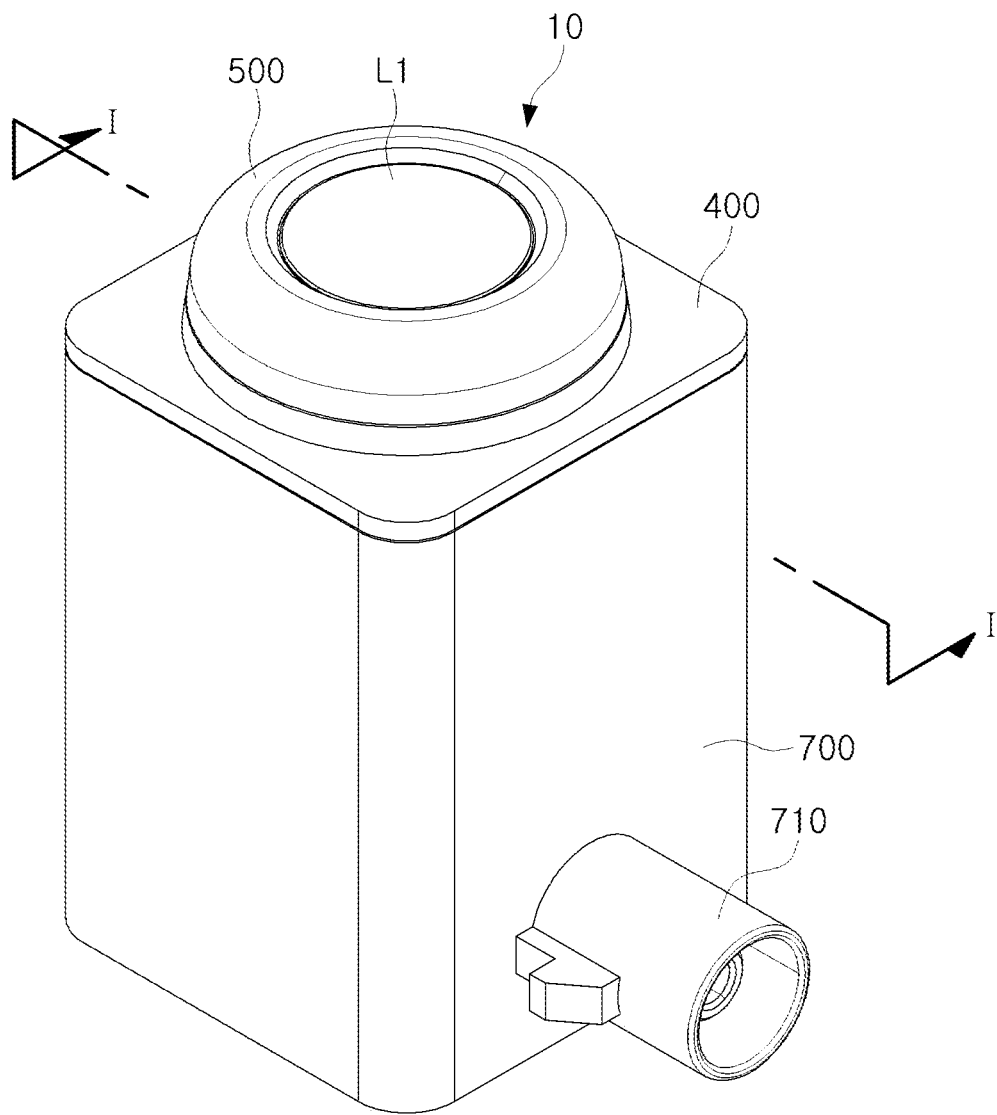
FIG. 2 is a perspective view illustrating the camera module illustrated in FIG. 1.

The camera module 10 configured as above may be configured in a form in which the side and the lower part are sealed by the housing 700, and the upper part is sealed by the barrel holder 400 and the cover member 700, as illustrated in FIG. 2. However, the front lens L1 may be disposed to protrude slightly upwardly of the barrel holder 400 to secure a wide angle of view. However, the front lens L1 does not necessarily protrude upwardly from the barrel holder 400.

The camera module 10 may be configured to block external air and internal penetration of foreign materials. For example, as described above, the airtight members 620 and 630 are disposed on the coupled portion of the front lens L1 and the cover member 500 and the coupled portion of the barrel holder 400 and the cover member 500, to block an intrusion and penetration of external air and foreign materials.

Figure 4:
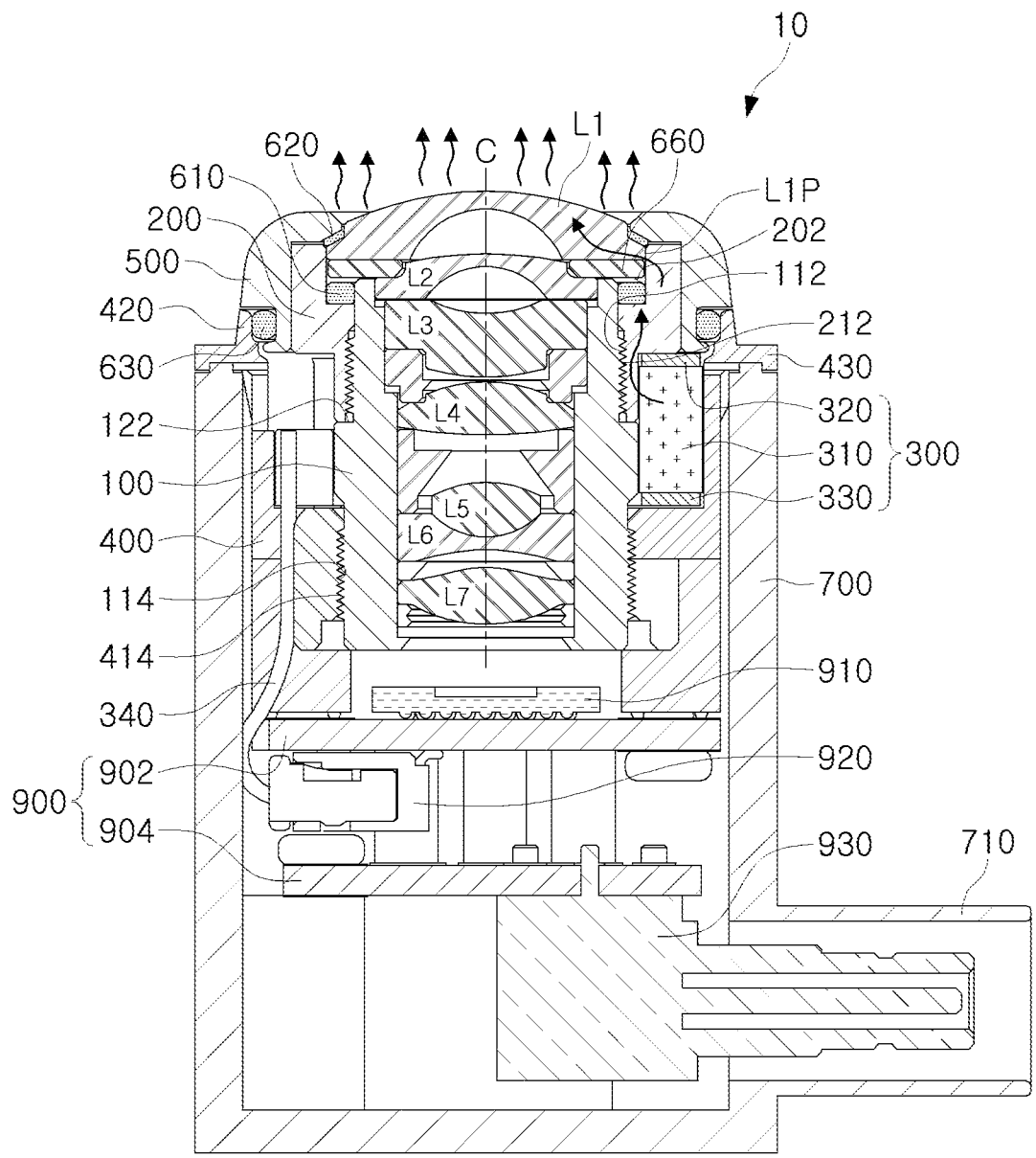
FIG. 4 is a cross-sectional view illustrating an operation principle of a camera module according to an example.
Figure 5:
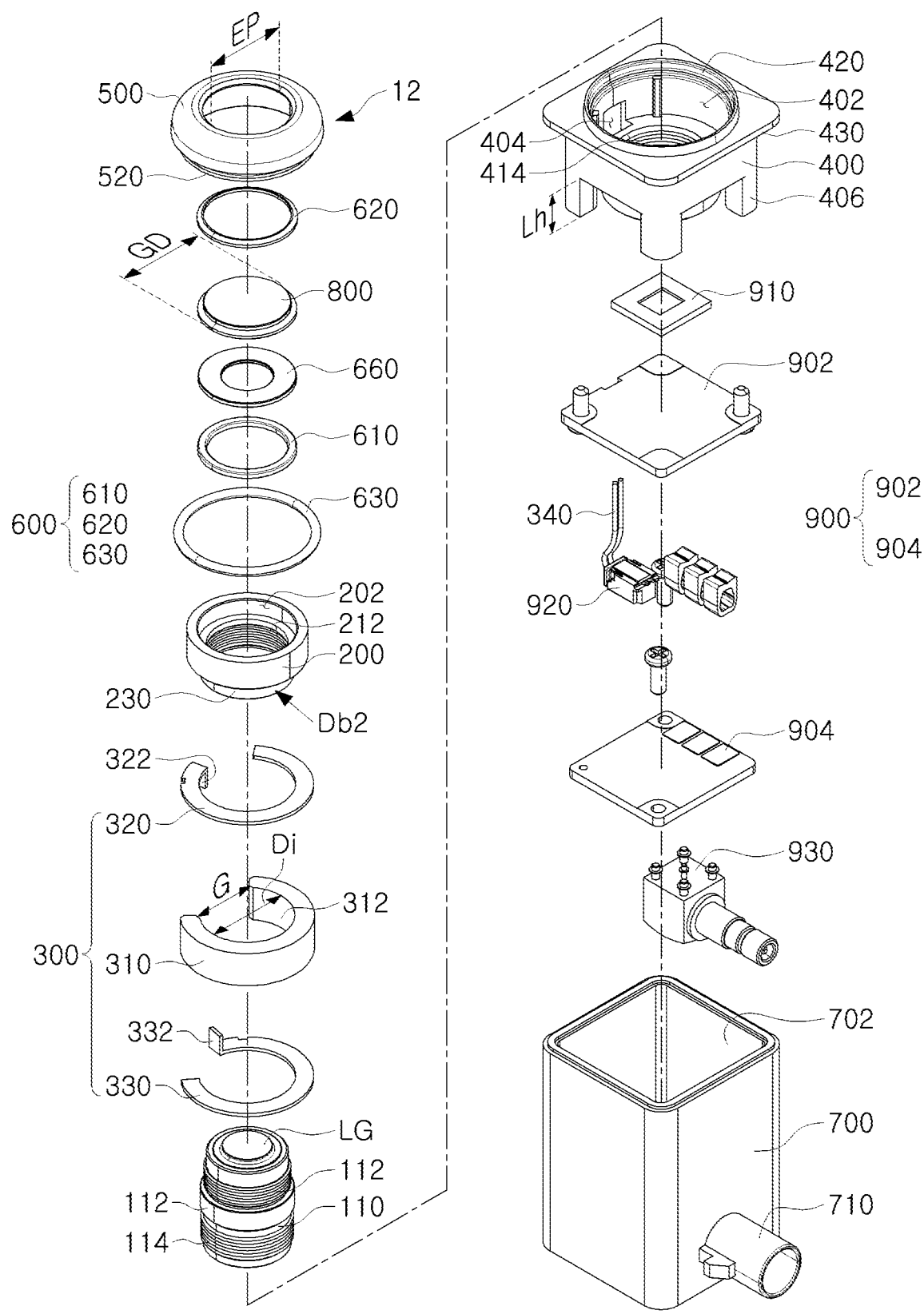
FIG. 5 is an exploded perspective view of a camera module according to another example.

The internal structure and usage example of the camera module 10 will be described with reference to FIGS. 3 and 4.

The camera module 10 is configured to protect major components from external impacts. For example, the lens barrels 100 and 200, the energy generating unit 300 and the barrel holder 400, which are main parts of the camera module 10, may be accommodated in the housing 700 to be protected from direct external impacts.

The camera module 10 may be configured to facilitate assembly and separation. For example, the assembly of the camera module 10 may be performed by inserting the lens barrels 100 and 200, the energy generating unit 300, the barrel holder 400, and the like into the housing 700 in a predetermined order in a loaded manner. In detail, the substrate 900, the barrel holder 400, the first lens barrel 100, the energy generating unit 300, the second lens barrel 200, the front lens L1 and the cover member 500 may be assembled in the interior of the housing 700 in order.

The camera module 10 may be configured such that relative positions are aligned by close coupling between parts. For example, the position of the first lens barrel 100 in the housing 700 may be fixed by being coupled to the barrel holder 400. As another example, the position of the second lens barrel 200 may be fixed by coupling with the first lens barrel 100. As another example, the position of the energy generating unit 300 may be fixed by contact with the lens barrels 100 and 200 and the barrel holder 400. As another example, the position of the front lens L1 may be aligned and fixed by contacting and coupling with the second lens barrel 200 and the cover member 500.

As described above, in the camera module 10 according to this example, a separate (optical axis) alignment process may be omitted since neighboring components are organically combined and contact with each other, and thus the relative positions thereof are aligned and fixed.

The camera module 10 according to this example may be configured to remove frost, raindrops or the like formed on the front lens L1. For example, the camera module 10 may maintain the surface of the front lens L1 in a constant state through the energy generating unit 300, which will be described with reference to FIG. 4 below.

The energy generating unit 300 may generate heat at a constant temperature. For example, the energy generating unit 300 may generate heat at a temperature of 40 to 60 degrees Celsius (C). However, the heating temperature of the energy generating unit 300 is not limited to 40 to 60 degrees C. For example, the heating temperature of the energy generating unit 300 may also be adjusted to 60 degrees C. or more (for example, 100 degrees C. or more).

The energy generating unit 300 may heat a member adjacent thereto. For example, heat of the energy generating unit 300 may be transferred to adjacent lens barrels 100 and 200 and barrel holder 400. However, the heat of the energy generating unit 300 is not all transferred to the neighboring lens barrels 100 and 200 and barrel holder 400. For example, heat of the energy generating unit 300 may be quickly transferred limitedly to a material having high thermal conductivity. In detail, the heat of the energy generating unit 300 may be transferred to the second lens barrel 200 having relatively high thermal conductivity, and may almost not be transferred to the first lens barrel 100 and the barrel holder 400 having relatively significantly low thermal conductivity.

Heat of the energy generating unit 300 may be transferred to the second lens barrel 200 through conduction and convection. In detail, a significant amount of heat of the energy generating unit 300 may be transmitted through a contact surface or a non-contact surface between the energy generating unit 300 and the second lens barrel 200.

The second lens barrel 200 may be heated by heat of the energy generating unit 300. For example, the second lens barrel 200 may be heated substantially to 40 to 60 degrees C., which is a heating temperature of the energy generating unit 300. The second lens barrel 200 heated to a predetermined temperature may transfer heat to neighboring members. For example, the second lens barrel 200 may transfer heat to adjacent first lens barrel 100, front lens L1 and cover member 500. However, the heat of the second lens barrel 200 is not transferred to all of the adjacent first lens barrel 100, front lens L1 and cover member 500. For example, heat of the second lens barrel 200 is limited to a material having high thermal conductivity and may be quickly transferred thereto. In detail, heat from the second lens barrel 200 is hardly transmitted to the first lens barrel 100 and the cover member 500, which have relatively low thermal conductivity, but may be transmitted only to the front lens L1. Heat transferred to the front lens L1 may be used to evaporate or remove frost and raindrops formed on the surface of the front lens L1.

Since the camera module 10 configured as above has a structure in which a relative position is fixed by close coupling and contact between members, a phenomenon in which optical performance is deteriorated due to external impacts may be reduced.

In addition, since the camera module 10 according to this example is configured to remove frost, raindrops and the like formed on the surface of the front lens L1, blurred vision, distortion of an image and the like due to frost, raindrops or the like may be significantly reduced.

Next, a camera module according to another example will be described with reference to FIGS. 5 to 8.

A camera module 12 according to an example includes a first lens barrel 100, a second lens barrel 200, an energy generating unit 300, and a barrel holder 400. In addition, the camera module 12 may further include a cover member 500, an airtight member 600, a housing 700, a protective glass 800, and a substrate 900.

The first lens barrel 100 is configured to accommodate one or more lens groups LG. For example, the first lens barrel 100 may be configured to accommodate a lens group LG comprised of six lenses L1, L2, L3, L4, L5, and L6. For example, disposed along an optical axis "C". However, the number of lens groups accommodated in the first lens barrel 100 is not limited to one. For example, the first lens barrel 100 may also be configured to accommodate a first lens group comprised of two to four lenses and a second lens group comprised of two to four lenses.

The first lens barrel 100 may be configured to maintain the lens group LG at a constant temperature. For example, the first lens barrel 100 may be formed of a material having low thermal conductivity such that external heat or cold air is not transmitted to the lens group LG accommodated therein. The first lens barrel 100 may be configured to reduce the weight of the camera module 12. For example, the first lens barrel 100 may be formed of a material such as plastic that is lightweight and resistant to impact. However, the material of the first lens barrel 100 is not limited to plastic.

The first lens barrel 100 may be configured to be rigidly coupled to neighboring members. As an example, a first screw portion 112 for coupling with the second lens barrel 200 may be formed on a portion of the first lens barrel 100. As another example, a second screw portion 114 for coupling with the barrel holder 400 may be formed on another portion of the first lens barrel 100. The screw portions 112 and 114 may be respectively formed on the outer circumferential surface of the first lens barrel 100. For example, a first screw portion 112 may be formed on the upper outer circumferential surface of the first lens barrel 110, and a second screw portion 114 may be formed on the lower outer circumferential surface of the first lens barrel 110. The screw portions 112 and 114 may be configured to define a coupling position between the first lens barrel 100 and the second lens barrel 200 and the barrel holder 400. For example, the first screw portion 112 and the second screw portion 114 may be formed to have different sizes. In detail, the second lens barrel 200 is limitedly coupled to the first screw portion 112 of the first lens barrel 100, and the barrel holder 400 is limitedly coupled to the second screw portion 114 of the first lens barrel 100. Accordingly, the first lens barrel 100 according to this example may significantly reduce an assembly failure phenomenon due to a change in the coupling position of the second lens barrel 200 and the barrel holder 400.

The first lens barrel 100 may include a configuration for defining a coupling position of the second lens barrel 200. For example, a first stepped portion 122 for contacting an end portion of the second lens barrel 200 may be formed on an outer peripheral surface of the first lens barrel 100. The first stepped portion 122 may be configured so as not to interfere with screwing of the first lens barrel 100 and the second lens barrel 200. For example, the first stepped portion 122 may be formed between the first screw portion 112 and the second screw portion 114.

The second lens barrel 200 is configured to be coupled to the first lens barrel 100. For example, a screw portion 212 fastened to the first screw portion 112 may be formed on the inner circumferential surface of the second lens barrel 200. Accordingly, the second lens barrel 200 may be firmly coupled to the first lens barrel 100 by fastening between the first screw portion 112 and the screw portion 212.

The second lens barrel 200 may be configured to accommodate the protective glass 800. For example, the second lens barrel 200 may accommodate the protective glass 800 in an internal space 202. The protective glass 800 may be disposed on the object side of the lens group LG. The protective glass 800 may be disposed closest to the object side in the camera module 12. The protective glass 800 may be configured so as not to affect the optical performance of the camera module 12. For example, the protective glass 800 may not have refractive power.

The second lens barrel 200 may be configured to contact the protective glass 800. For example, the second lens barrel 200 may contact the edge of the protective glass 800.

The second lens barrel 200 may be configured to absorb thermal energy generated from the energy generating unit 300. For example, the second lens barrel 200 may be formed of a material having relatively high specific heat to absorb a significant amount of thermal energy. The second lens barrel 200 may be configured to transmit the absorbed thermal energy to the protective glass 800. For example, the second lens barrel 200 may be formed of a material having high thermal conductivity. In detail, the second lens barrel 200 may be formed of a metal material. However, the material of the second lens barrel 200 is not limited to metal. The second lens barrel 200 may have a higher thermal conductivity than that of neighboring members. For example, the second lens barrel 200 may be formed of a material having a higher thermal conductivity than the first lens barrel 100 and the barrel holder 400.

The second lens barrel 200 may be configured to contact the energy generating unit 300. In detail, the second lens barrel 200 may be configured to contact the energy generating unit 300 in a state in which the second lens barrel 200 is coupled to the first lens barrel 100. The second lens barrel 200 may include an extension 230 extending downwardly (in the direction of the image sensor). The extension 230 may be configured to contact the energy generating unit 300. For example, the extension 230 may contact the energy generating unit 300 while the second lens barrel 200 is coupled to the first lens barrel 100. The second lens barrel 200 may be configured to be in closer contact with the energy generating unit 300 than the first lens barrel 100. For example, a distance from an inner surface 312 of the energy generating unit 300 to an outer peripheral surface of the extension 230 may be less than a distance from the inner surface 312 of the energy generating unit 300 to an outer peripheral surface of the first lens barrel 100. However, the distance from the inner surface 312 of the energy generating unit 300 to the outer peripheral surface of the extension 230 is not necessarily less than the distance from the inner surface 312 of the energy generating unit 300 to the outer peripheral surface of the first lens barrel 100. For example, the distance from the inner surface 312 of the energy generating unit 300 to the outer peripheral surface of the extension 230 may be approximately the same as the distance from the inner surface 312 of the energy generating unit 300 to the outer peripheral surface of the first lens barrel 100.

The energy generating unit 300 may be configured to generate thermal energy for heating an adjacent member. For example, the energy generating unit 300 may include an electrical resistor configured to convert electrical energy into thermal energy. As another example, the energy generating unit 300 may be configured in the form of a PTC heater configured to dissipate heat of a constant temperature. As another example, the energy generating unit 300 may include a vibration device configured to generate thermal energy through vibration. However, the shape of the energy generating unit 300 is not limited to the types listed above.

The energy generating unit 300 according to this example may include a heating member 310, a first electrode member 320, and a second electrode member 330.

The heating member 310 may be configured to convert electrical energy into thermal energy. For example, the heating member 310 may be formed of a material such as ceramic having high electrical resistance. However, the material of the heating member 310 is not limited to ceramic. The heating member 310 may be formed to have a ring shape with one side open. The heating member 310 may be configured to be elastically deformable. For example, a distance G between both ends of the heating member 310 may be expanded or reduced according to the elastic deformation of the heating member 310.

The heating member 310 may be configured to be in close contact with the second lens barrel 200. For example, an inner diameter Di of the heating member 310 may be substantially the same as an outer diameter Db2 of an extension 220 of the second lens barrel 200. However, the inner diameter Di of the heating member 310 is not necessarily the same as the outer diameter Db2 of the extension 220 of the second lens barrel 200. For example, the inner diameter Di of the heating member 310 may be less than the outer diameter Db2 of the extension 220 of the second lens barrel 200. The inner diameter Di of the heating member 200 may be changed by elastic deformation of the heating member 200. For example, the inner diameter Di of the heating member 310 is less than the outer diameter Db2 of the extension 220 of the second lens barrel 200. However, when the heating member 310 is coupled to the extension 220 of the second lens barrel 200, the inner diameter Di of the heating member 310 may be elastically deformed to have substantially the same size as the outer diameter Db2 of the extension 220. As described above, since the heating member 310 that is elastically deformable may be in close contact with the second lens barrel 200, thermal energy contained therein may be quickly transferred to the second lens barrel 200.

The first electrode member 320 and the second electrode member 330 may be configured to supply current to the heating member 310. For example, the first electrode member 320 and the second electrode member 330 are electrically connected to a power supply terminal 920 of the substrate 900, to provide the current supplied from the power supply terminal 920 to the heating member 310. The first electrode member 320 and the second electrode member 330 may be disposed on the heating member 310. For example, the first electrode member 320 may be disposed on the heating member 310, and the second electrode member 330 may be disposed below the heating member 310. However, the arrangement positions of the electrode members 320 and 330 are not limited to the upper and lower portions of the heating member 310. For example, the electrode members 320 and 330 may also be disposed on the inner and outer circumferential surfaces of the heating member 310 within a range that does not interfere with the contact between the heating member 310 and the second lens barrel 200. The electrode members 320 and 330 may be configured to be connected to a connection line 340 (see FIG. 3). For example, terminals 322 and 332 to be connected to the connection line 340 may be formed on one ends of the electrode members 320 and 330. The terminals 322 and 332 may be formed to be bent toward one side. For example, the terminals 322 and 332 may be configured to be bent in the longitudinal direction of the camera module 12. However, the terminals 322 and 332 are not necessarily configured in a bent shape.

The barrel holder 400 may be configured to accommodate the first lens barrel 100. For example, the first lens barrel 100 may be accommodated in an internal space 402 of the barrel holder 400. The barrel holder 400 may be configured to be coupled to the first lens barrel 100. For example, a screw portion 414 for fastening with the second screw portion 114 of the first lens barrel 100 may be formed in the internal space 402 of the barrel holder 400.

The barrel holder 400 may be configured to enable the withdrawal and insertion of the connection line 340. For example, a hole 404 may be formed in one side of the barrel holder 400 to allow the connection line 340 to be drawn and inserted thereinto.

The barrel holder 400 may be configured to be coupled to the substrate 900. For example, the barrel holder 400 may be coupled to the substrate 900 by a plurality of leg members 406 extending downwardly. The barrel holder 400 may be configured such that a distance from the end of the first lens barrel 100 to the substrate 900 or an image sensor 910 is sufficiently formed. For example, the leg member 406 of the barrel holder 400 may extend to have a significant length Lh in such a manner that a distance from the end of the first lens barrel 100 to the image sensor 910 is sufficiently formed.

The cover member 500 may be configured to be coupled to the second lens barrel 200. For example, the cover member 500 may be firmly coupled to the outer circumferential surface of the second lens barrel 200 by unit of force fitting, screw fastening, or the like.

The cover member 500 may be configured to prevent separation of the protective glass 800. For example, the cover member 500 may be coupled to the second lens barrel 200 while pressing the edge of the protective glass 800. The cover member 500 may have an opening 510 that allows the incidence of light. A diameter EP of the opening 510 may have a predetermined large-small relationship with the size of the protective glass 800. For example, the diameter EP of the opening 510 may be less than a diameter GD of the protective glass 800.

The cover member 500 may be configured to significantly reduce penetration of external heat or cold air. For example, the cover member 500 may be formed of a material having low thermal conductivity. The cover member 500 may be configured to significantly reduce a phenomenon in which heat of the second lens barrel 200 is lost externally. For example, the cover member 500 may be formed of a material capable of keeping warm.

The airtight member 600 may be configured to block the intrusion or penetration of external air or foreign materials into the camera module 12. For example, the airtight member 600 may be configured to block the intrusion of external air or foreign materials through the coupled portion between the member and the member. The airtight member 600 may include a first airtight member 610, a second airtight member 620, and a third airtight member 630.

The first airtight member 610 may be disposed between the first lens barrel 100 and the second lens barrel 200. For example, the first airtight member 610 is disposed between the outer circumferential surface of the first lens barrel 100 and the inner circumferential surface of the second lens barrel 200 as illustrated in FIG. 3, to block the inflow of foreign materials through the coupled portion between the first lens barrel 100 and the second lens barrel 200.

The second airtight member 620 may be disposed between the protective glass 800 and the cover member 500. For example, the second airtight member 620 is disposed between the protective glass 800 and the cover member 500 to block inflow of foreign materials and outside air through a contact portion or a gap between the protective glass 800 and the cover member 500.

The third airtight member 630 may be disposed between the barrel holder 400 and the cover member 500. For example, the third airtight member 630 is disposed between an upper stepped portion 420 of the barrel holder 400 and a lower extension 520 of the cover member 500, to block the inflow of foreign materials and outside air through a contact portion or a gap between the barrel holder 400 and the cover member 500.

The camera module 12 may further include a gap maintaining member 660 as necessary. The gap maintaining member 660 may be disposed between the protective glass 800 and the lens group LG to maintain a constant distance between the protective glass 800 and the lens group LG. In addition, the gap maintaining member 660 may be configured to block or significantly reduce heat transfer between the protective glass 800 and the lens group LG. For example, the gap maintaining member 660 may be formed of a material having low thermal conductivity.

The housing 700 may be configured to accommodate the lens barrels 100 and 200, the energy generating unit 300, the barrel holder 400, and the substrate 900 therein. For example, an internal space 702 capable of accommodating the aforementioned members may be formed in the housing 700. The internal space 702 may be open to one side (upper side) of the housing 700.

The housing 700 may be configured to be coupled to the barrel holder 400. For example, the housing 700 may be coupled to a flange 430 of the barrel holder 400 by a protrusion and a groove, a bolt or screw, an adhesive, or the like. The housing 700 may include a configuration for enabling connection between the substrate 900 or a component mounted on the substrate 900 and an external device. For example, a connector 710 that is open inwardly may be formed in one side of the housing 700.

The housing 700 may be configured to protect internal components from external impacts. For example, the housing 700 may be formed of a material having a predetermined strength and rigidity. The housing 700 may be configured to significantly reduce a phenomenon in which performance of the camera module 12 deteriorates due to external heat and cold air. For example, the housing 700 may be formed of a material having a low thermal conductivity to maintain a constant internal temperature.

The substrate 900 may provide a mounting space for various components required for the operation of the camera module 12. For example, the image sensor 910, the power supply terminal 920, a connection terminal 930, a passive device, and the like may be mounted on the substrate 900. The substrate 900 may be configured in plural. For example, the substrate 900 may include a first substrate 902 and a second substrate 904. However, the number of substrates 900 is not limited to two. For example, the substrate 900 may also be comprised of one substrate, or three or more.

The image sensor 910 is disposed on the first substrate 902 and is configured to convert an optical signal into an electric signal. The power supply terminal 920 is electrically connected to the energy generating unit 300 and may supply current required for the operation of the energy generating unit 300. The power supply terminal 920 may be disposed on the first substrate 902 or the second substrate 904. The connection terminal 930 is disposed on the second substrate 904 and may enable electrical connection between the camera module 12 and an external device.

Figure 6:
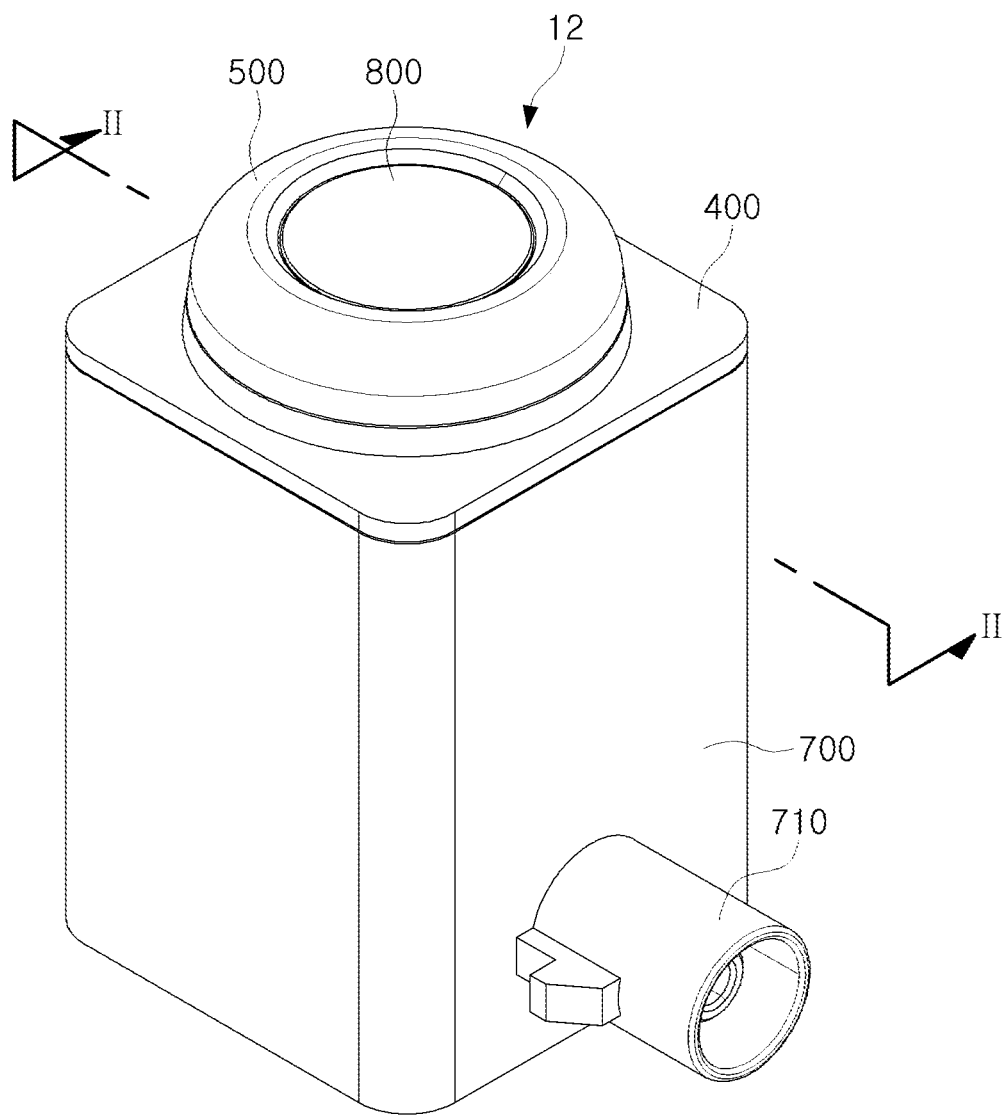
FIG. 6 is a combined perspective view of the camera module illustrated in FIG. 5.

The camera module 12 configured as above is configured in a form in which the side and the lower part are sealed by the housing 700 and the upper part is sealed by the barrel holder 400 and the cover member 700, as illustrated in FIG. 6.

The camera module 12 may be configured to block internal penetration of external air and foreign materials. For example, the coupled portion of the protective glass 800 and the cover member 500 and the coupled portion of the barrel holder 400 and the cover member 500 may be provided with the airtight members 620 and 630 disposed thereon, as described above, to block intrusion and penetration of external air and foreign materials.

Figure 7:
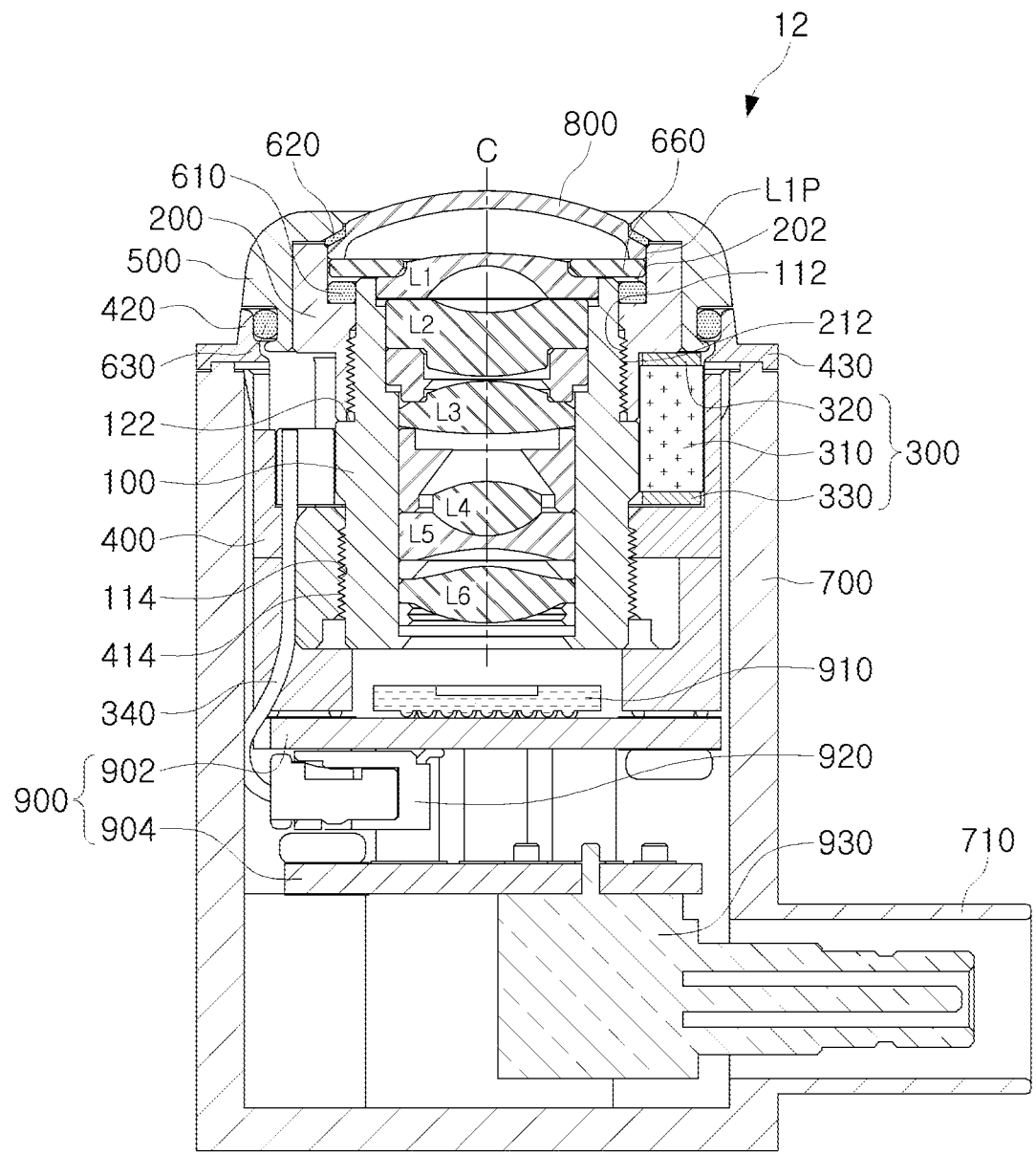
FIG. 7 is a cross-sectional view of the camera module illustrated in FIG. 6.
Figure 8:
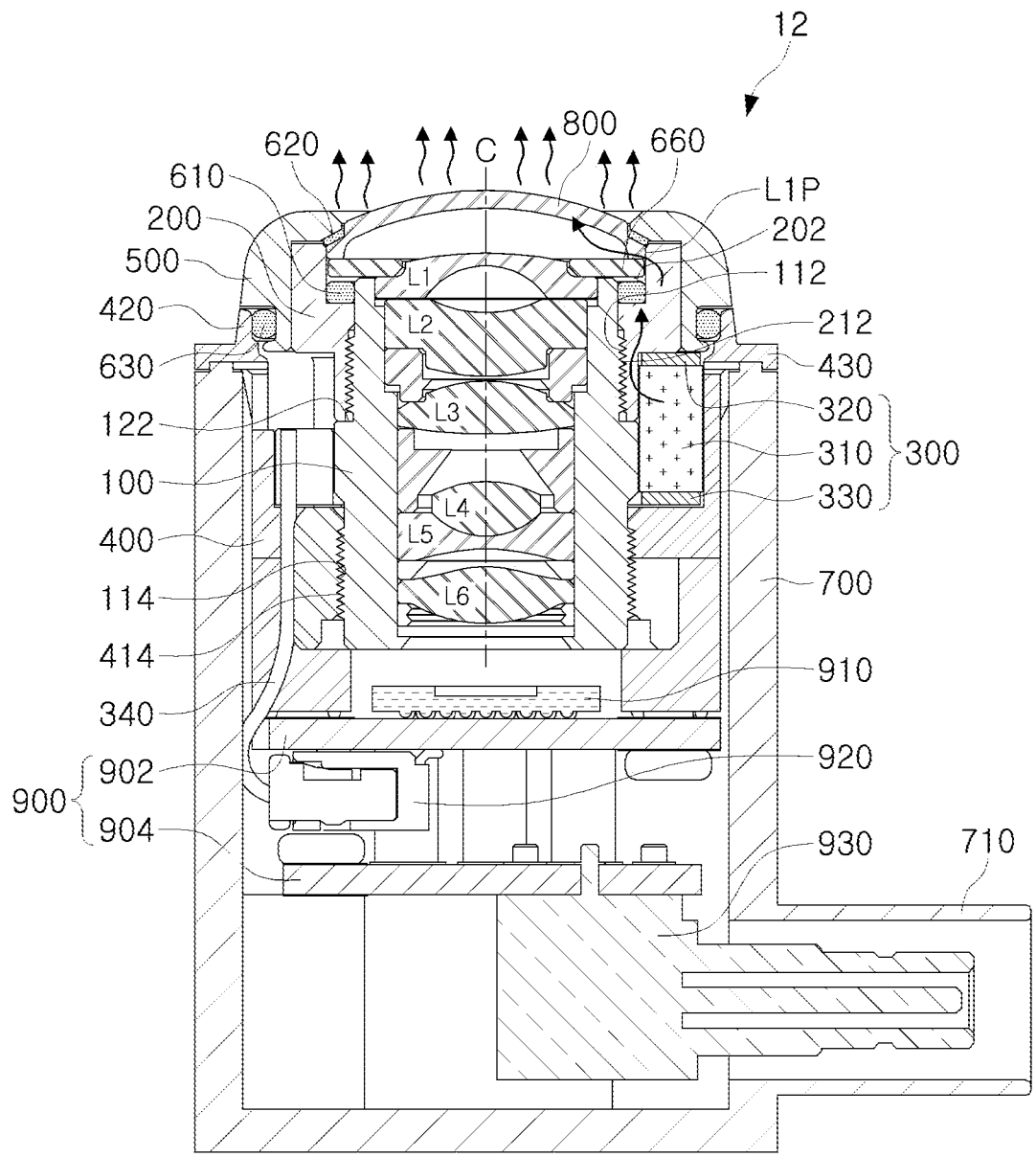
FIG. 8 is a cross-sectional view illustrating an operation principle of a camera module according to another example.

The internal structure and usage example of the camera module 12 will be described with reference to FIGS. 7 and 8.

The camera module 12 is configured to protect major components from external impacts. The main parts of the camera module 12, for example, the lens barrels 100 and 200, the energy generating unit 300 and the barrel holder 400, may be accommodated in the housing 700 to be protected from direct external impacts.

The camera module 12 may be configured to facilitate assembly and separation. For example, the assembly of the camera module 12 may be performed by inserting the lens barrels 100 and 200, the energy generating unit 300, the barrel holder 400, and the like, into the housing 700 in a predetermined order in a loaded manner. In detail, the substrate 900, the barrel holder 400, the first lens barrel 100, the energy generating unit 300, the second lens barrel 200, the protective glass 800, and the cover member 500 may be assembled in the interior of the housing 700 in order.

The camera module 12 may be configured in such a manner that components are organically coupled to each other and relative positions thereof may be aligned. For example, the position of the first lens barrel 100 in the housing 700 may be fixed by being coupled to the barrel holder 400. As another example, the position of the second lens barrel 200 may be fixed by coupling with the first lens barrel 100. As another example, the position of the energy generating unit 300 may be fixed by contact with the lens barrels 100 and 200 and the barrel holder 400. As another example, the position of the protective glass 800 may be fixed by contacting and coupling with the second lens barrel 200 and the cover member 500.

As described above, in the camera module 12 according to this example, a separate (optical axis) alignment process may be omitted since neighboring parts are organically combined and contacted with each other to align and fix relative positions thereof.

The camera module 12 according to this example may be configured to remove frost, raindrops, and the like formed on the protective glass 800. For example, the camera module 12 may maintain the surface of the protective glass 800 in a constant state through the energy generating unit 300, which will be described with reference to FIG. 8 below.

The energy generating unit 300 may generate heat at a constant temperature. For example, the energy generating unit 300 may generate heat at a temperature of 40 to 60 degrees C. However, the heating temperature of the energy generating unit 300 is not limited to 40 to 60 degrees C. For example, the heating temperature of the energy generating unit 300 may be adjusted to 60 degrees C. or more (for example, 100 degrees C. or more).

The energy generating unit 300 may heat adjacent members. For example, heat of the energy generating unit 300 may be transferred to the lens barrels 100 and 200 and the barrel holder 400, adjacent thereto. However, the heat of the energy generating unit 300 is not transferred to all of the neighboring lens barrels 100 and 200 and barrel holder 400. For example, heat of the energy generating unit 300 is limited to a material having high thermal conductivity and may be quickly transferred thereto. In detail, the heat of the energy generating unit 300 may be transferred to the second lens barrel 200 having relatively high thermal conductivity, and may almost not be transferred to the first lens barrel 100 and the barrel holder 400 having relatively significantly low thermal conductivity.

Heat of the energy generating unit 300 may be transferred to the second lens barrel 200 through conduction and convection. In detail, a significant amount of heat of the energy generating unit 300 may be transmitted through a contact surface or a non-contact surface between the energy generating unit 300 and the second lens barrel 200.

The second lens barrel 200 may be heated by the heat of the energy generating unit 300. For example, the second lens barrel 200 may be heated to 40 to 60 degrees C., which is substantially a heating temperature of the energy generating unit 300. The second lens barrel 200 heated to a predetermined temperature may transfer heat to neighboring members. For example, the second lens barrel 200 may transfer heat to the neighboring first lens barrel 100, protective glass 800 and cover member 500. However, the heat of the second lens barrel 200 is not transferred to all of the neighboring first lens barrel 100, protective glass 800 and cover member 500. For example, heat of the second lens barrel 200 may be limitedly quickly transferred to a material having high thermal conductivity. In detail, heat of the second lens barrel 200 is hardly transferred to the first lens barrel 100 and the cover member 500, which have a relatively low thermal conductivity, and may be transferred only to the protective glass 800. Heat transferred to the protective glass 800 may be used to evaporate or remove frost, raindrops, and the like formed on the surface of the protective glass 800.

Since the camera module 12 configured as above may remove frost, raindrops and the like formed on the surface of the protective glass 800, obstruction of the view and distortion of an image due to frost, raindrops or the like may be significantly reduced.

As set forth above, a phenomenon of deterioration of resolution due to foreign materials and obstruction of the field of view due to foreign materials may be prevented.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a first lens barrel configured to receive one or more lens groups;
   a second lens barrel coupled to the first lens barrel and configured to support a front lens disposed on an object side of the one or more lens groups;
   a cover member coupled to the second lens barrel and configured to press an edge of the front lens;
   an energy generating unit configured to contact the second lens barrel and configured to supply thermal energy to the second lens barrel; and
   a barrel holder coupled to the first lens barrel and configured to accommodate the energy generating unit.

2. The camera module of claim 1, wherein the second lens barrel is formed of a material having a thermal conductivity higher than a thermal conductivity of the first lens barrel.

3. The camera module of claim 1, wherein the second lens barrel is formed of a material having a thermal conductivity higher than a thermal conductivity of the barrel holder.

4. The camera module of claim 1, further comprising a first airtight member disposed between the first lens barrel and the second lens barrel.

5. The camera module of claim 1, further comprising a housing configured to be coupled to the barrel holder.

6. The camera module of claim 1, further comprising a second airtight member disposed between the barrel holder and the cover member.

7. The camera module of claim 1, further comprising a gap maintaining member disposed between the one or more lens groups and the front lens.

8. A camera module comprising:
   a first lens barrel configured to accommodate one or more lens groups;
   a second lens barrel coupled to the first lens barrel and configured to support a protective glass disposed on an object side of the one or more lens groups;
   an energy generating unit configured to contact the second lens barrel and configured to supply thermal energy to the protective glass; and
   a barrel holder coupled to the first lens barrel and configured to receive the energy generating unit.

9. The camera module of claim 8, wherein the second lens barrel is formed of a material having a thermal conductivity higher than a thermal conductivity of the first lens barrel.

10. The camera module of claim 8, further comprising a first airtight member disposed on the first lens barrel and the second lens barrel.

11. The camera module of claim 8, further comprising a cover member coupled to the second lens barrel and configured to press an edge of the protective glass.

12. The camera module of claim 11, further comprising a second airtight member disposed between the barrel holder and the cover member.

13. The camera module of claim 8, wherein the energy generating unit comprises:
    a heating member;
    a first electrode member disposed on one side of the heating member; and
    a second electrode member disposed on an other side of the heating member.

14. The camera module of claim 8, further comprising a first substrate coupled to the barrel holder and provided with an image sensor mounted thereon.

15. The camera module of claim 14, further comprising a second substrate electrically connected to the energy generating unit and disposed at a distance from the first substrate.

16. A camera module comprising:
    an energy generating unit;
    a front lens disposed on an optical axis;
    a heat transfer member disposed between the energy generating unit and the front lens; and
    a cover member coupled to the heat transfer member and configured to press an edge of the front lens,
    wherein the heat transfer member is configured to supply thermal energy to the front lens.

17. The camera module of claim 16, wherein the front lens has refractive power.

18. The camera module of claim 16, further comprising a first lens barrel disposed toward an image side of the front lens, and configured to accommodate one or more lens groups along the optical axis,
    wherein the heat transfer member has greater thermal conductivity than the first lens barrel.

19. The camera module of claim 18, wherein the heat transfer member comprises a second lens barrel coupled to the first lens barrel, and is configured to support the front lens.

20. The camera module of claim 19, further comprising a barrel holder accommodating the first lens barrel,
wherein the second lens barrel is formed of a material having a thermal conductivity higher than a thermal conductivity of the barrel holder.

21. The camera module of claim 16, further comprising a sealing structure disposed between the heat transfer member and the front lens.

* * * * *